United States Patent
Fujimura et al.

(10) Patent No.: US 12,358,796 B2
(45) Date of Patent: Jul. 15, 2025

(54) METHOD FOR PRODUCING FLUORINE GAS

(71) Applicant: SHOWA DENKO K.K., Tokyo (JP)

(72) Inventors: Koki Fujimura, Tokyo (JP); Hiroshi Kobayashi, Tokyo (JP); Yohsuke Fukuchi, Tokyo (JP)

(73) Assignee: Resonac Corporation, Tokyo (JP)

( * ) Notice: Subject to any disclaimer, the term of this patent is extended or adjusted under 35 U.S.C. 154(b) by 819 days.

(21) Appl. No.: 17/595,873

(22) PCT Filed: Aug. 20, 2020

(86) PCT No.: PCT/JP2020/031486
§ 371 (c)(1),
(2) Date: Nov. 29, 2021

(87) PCT Pub. No.: WO2021/039594
PCT Pub. Date: Mar. 4, 2021

(65) Prior Publication Data
US 2022/0234890 A1    Jul. 28, 2022

(30) Foreign Application Priority Data
Aug. 30, 2019   (JP) .................................. 2019-158419

(51) Int. Cl.
 *C01B 7/20* (2006.01)
 *C01B 7/19* (2006.01)
 *C25B 1/24* (2021.01)

(52) U.S. Cl.
 CPC .................. *C01B 7/20* (2013.01); *C01B 7/19* (2013.01); *C25B 1/24* (2013.01)

(58) Field of Classification Search
 CPC ................ C01B 7/20; C01B 7/19; C25B 1/24
 See application file for complete search history.

(56) References Cited

U.S. PATENT DOCUMENTS

| | | | |
|---|---|---|---|
| 5,032,371 A | 7/1991 | Buehler | |
| 5,290,413 A * | 3/1994 | Bauer | C25B 1/245 |
| | | | 204/243.1 |
| 5,399,718 A * | 3/1995 | Costello | C07D 313/04 |
| | | | 560/180 |
| 5,482,682 A | 1/1996 | Tarancon | |
| 8,030,528 B2 | 10/2011 | Ohno et al. | |
| 2001/0022957 A1 | 9/2001 | Subbanna et al. | |
| 2007/0215460 A1 | 9/2007 | Tojo et al. | |
| 2010/0121118 A1 | 5/2010 | Ohno et al. | |
| 2010/0252425 A1 | 10/2010 | Tao et al. | |
| 2011/0105807 A1 | 5/2011 | Kopkalli et al. | |
| 2017/0121257 A1 * | 5/2017 | Sharratt | C07C 17/389 |
| 2018/0194703 A1 | 7/2018 | Chiu et al. | |

FOREIGN PATENT DOCUMENTS

| | | |
|---|---|---|
| JP | 4-503658 A | 7/1992 |
| JP | 5-209291 A | 8/1993 |
| JP | 3416066 B2 | 6/2003 |
| JP | 4717083 B2 | 7/2011 |
| JP | 5621024 B2 | 11/2014 |
| JP | 2018-135320 A | 8/2018 |
| WO | 2008/133086 A1 | 11/2008 |

OTHER PUBLICATIONS

International Search Report dated Oct. 27, 2020 in Application No. PCT/JP2020/031486.
International Preliminary Report on Patentability with Written Opinion dated Mar. 1, 2022 in International Application No. PCT/JP2020/031486.

* cited by examiner

*Primary Examiner* — Yong L Chu
(74) *Attorney, Agent, or Firm* — Sughrue Mion, PLLC

(57) ABSTRACT

A method for producing fluorine gas including a fluorination step of obtaining a reaction mixture containing a major fluorinated substance that is a target component generated by fluorination of a raw material compound and by-product hydrogen fluoride, a separation step of separating the reaction mixture to obtain a main product component containing the major fluorinated substance and a by-product component containing the by-product hydrogen fluoride, a purification step of purifying the by-product component to obtain a recovered hydrogen fluoride component in which a concentration of an organic substance is reduced and a concentration of the by-product hydrogen fluoride is increased, an electrolysis step of performing electrolysis using the recovered hydrogen fluoride component as at least a part of an electrolyte to produce fluorine gas, and an introduction step of introducing the fluorine gas obtained in the electrolysis step into a reaction field for fluorination in the fluorination step.

11 Claims, 1 Drawing Sheet

METHOD FOR PRODUCING FLUORINE GAS

CROSS REFERENCE TO RELATED APPLICATIONS

This application is a National Stage of International Application No. PCT/JP2020/031486 filed Aug. 20, 2020, claiming priority based on Japanese Patent Application No. 2019-158419 filed Aug. 30, 2019.

TECHNICAL FIELD

The present invention relates to a method for producing fluorine gas.

BACKGROUND ART

Fluorine gas ($F_2$) or fluorine-containing organic compounds are widely used in the nuclear power industrial field, the semiconductor industrial field, the pharmaceutical and agrochemical field, and the consumer field. Among them, fluorine gas is an extremely highly reactive substance, and thus a reaction for producing fluorine gas is necessarily an endothermic reaction. Therefore, the production of fluorine gas is not possible in methods other than an electrolysis method where an endothermic reaction is easily caused, and almost all fluorine gas is produced by the electrolysis method.

In addition, a number of fluorine-containing organic compounds are synthesized by a direct fluorination reaction. In the direct fluorination reaction, fluorine gas is reacted with an organic compound, whereby hydrogen atoms in the organic compound are substituted with fluorine atoms to generate a fluorine-containing organic compound, and at the same time, hydrogen fluoride (HF) is generated as a by-product from the hydrogen atoms that have been substituted with the fluorine atoms and desorbed from the organic compound.

This direct fluorination reaction is an exothermic reaction where a large amount of reaction heat is generated, and thus the temperature of the reaction field is likely to rise. Therefore, a fluorine-containing organic compound that is a by-product component other than the fluorine-containing organic compound that is the target component is likely to be generated, and thus it has been common to discard a by-product left after the fluorine-containing organic compound that is the target component is separated, the by-product containing the by-product hydrogen fluoride and the fluorine-containing organic compound that is a by-product component.

If it is possible to reuse the discarded by-product hydrogen fluoride as a raw material for the production of fluorine gas by the electrolysis method, the production cost of the fluorine-containing organic compound that is the target component can be reduced, which is economical.

CITATION LIST

Patent Literature

PTL 1: Japanese Patent No. 5621024
PTL 2: Japanese Patent No. 4717083
PTL 3: Japanese Patent No. 3416066

SUMMARY OF INVENTION

Technical Problem

However, the above-described by-product hydrogen fluoride contains a component that impairs electrolysis, and thus it has been difficult to use the hydrogen fluoride as a raw material for the production of fluorine gas by the electrolysis method.

For example, PTL 1 describes that moisture present in an electrolyte raises anode voltages and thus the electrolyte desirably contains no moisture, and it is found that the hydrogen fluoride, which serves as a raw material for the production of fluorine gas by the electrolysis method, also desirably contains no moisture.

An object of the present invention is to provide a method for producing fluorine gas in which by-product hydrogen fluoride, which is generated as a by-product at the time when a fluorinated substance that is a target component is produced by reacting a raw material compound with fluorine gas to fluorinate the raw material compound, can be reused as a raw material for the production of fluorine gas by an electrolysis method.

Solution to Problem

An aspect of the present invention is as described in the following [1] to [8] to achieve the above-described object.

[1] A method for producing fluorine gas including
reacting a raw material compound with fluorine gas to perform fluorination and obtaining a reaction mixture containing a major fluorinated substance as a target component generated by the fluorination of the raw material compound, a minor fluorinated substance as a non-target component generated as a by-product by the fluorination of the raw material compound, and by-product hydrogen fluoride generated as a by-product in the fluorination,
separating the reaction mixture to obtain a main product component containing the major fluorinated substance as a majority component and a by-product component, the by-product component being a component other than the main product component and containing the by-product hydrogen fluoride,
purifying the by-product component to obtain a recovered hydrogen fluoride component in which a concentration of an organic substance contained in the by-product component is reduced and a concentration of the by-product hydrogen fluoride is increased,
performing electrolysis using the recovered hydrogen fluoride component as at least a part of an electrolyte to produce fluorine gas, and
introducing the fluorine gas obtained in the electrolysis into a reaction field for the fluorination in performing the fluorination to use the fluorine gas obtained in the electrolysis step as at least a part of fluorine gas used in the fluorination.

[2] The method for producing fluorine gas according to [1], in which the organic substance contained in the by-product component is at least one of the raw material compound that is not reacted, the minor fluorinated substance, a solvent caused to coexist with the raw material compound and the fluorine gas in the reaction field for the fluorination, a fluorinated substance of the solvent, a diluent gas caused to coexist with the raw material compound and the fluorine gas in the reaction field for the fluorination, a fluorinated substance of the diluent gas, an organic compound that is used in a reaction device in which the fluorination is performed and can be present in the reaction field, and a fluorinated substance of the organic compound.

[3] The method for producing fluorine gas according to [1] or [2], in which the raw material compound is a compound having 2 or more and 18 or less carbon atoms and having 1 or more hydrogen atoms.

[4] The method for producing fluorine gas according to [3], in which the compound having 2 or more and 18 or less carbon atoms and having 1 or more hydrogen atoms is an alkane or a halogenated alkane, and the halogenated alkane is an alkane in which a part or all of hydrogen atoms in the alkane are each substituted with a halogen atom other than fluorine.

[5] The method for producing fluorine gas according to any one of [1] to [4], in which a method for purifying the by-product component in the purification includes at least one of a distillation operation, an adsorption operation, and a liquid-liquid separation operation.

[6] The method for producing fluorine gas according to [5], in which the distillation operation includes distilling a hydrogen fluoride aqueous solution obtained by causing the by-product hydrogen fluoride in the by-product component to be absorbed in water.

[7] The method for producing fluorine gas according to [5], in which the adsorption operation includes causing the organic substance in the by-product component to be adsorbed to an adsorbent having at least one of activated carbon and alumina.

[8] The method for producing fluorine gas according to any one of [1] to [7], in which, in the purification, the by-product component is purified such that a total concentration of the organic substance in the recovered hydrogen fluoride component becomes 200 mass ppm or less.

Advantageous Effects of Invention

In the method for producing fluorine gas according to the present invention, by-product hydrogen fluoride, which is generated as a by-product at the time when a fluorinated substance that is a target component is produced by reacting a raw material compound with fluorine gas to fluorinate the raw material compound, can be reused as a raw material for the production of fluorine gas by an electrolysis method, which is economical, the performance of electrodes that are used for electrolysis is less likely to deteriorate, and electrolysis can be performed stably.

DESCRIPTION OF EMBODIMENTS

An embodiment of the present invention will be described below. The present embodiment is to describe an example of the present invention, and the present invention is not limited to the present embodiment. In addition, a variety of modifications or improvements can be added to the present embodiment, and aspects to which such modifications or improvements are added can also be included in the present invention.

Figure 1:
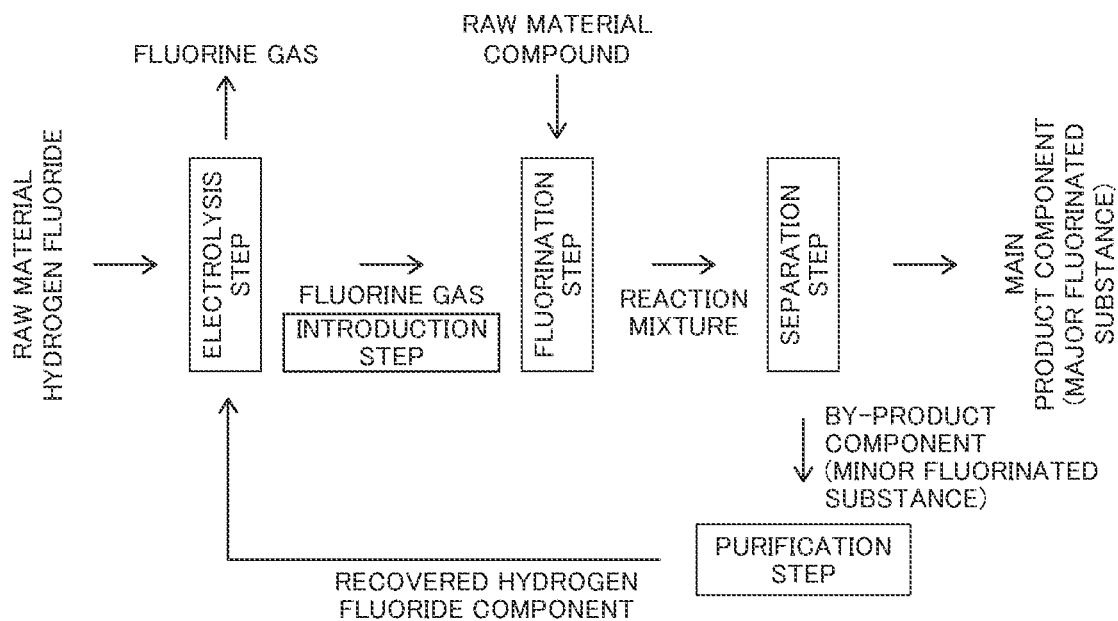
FIG. 1 is a step view describing an embodiment of a method for producing fluorine gas according to the present invention.

A method for producing fluorine gas according to the present embodiment includes a fluorination step, a separation step, a purification step, an electrolysis step, and an introduction step (refer to FIG. 1).

The fluorination step is a step where fluorine gas is reacted with a raw material compound to perform fluorination and a reaction mixture containing a major fluorinated substance that is a target component generated by the fluorination of the raw material compound, a minor fluorinated substance that is a non-target component generated as a by-product by the fluorination of the raw material compound, and by-product hydrogen fluoride generated as a by-product in the fluorination is obtained.

The separation step is a step where the reaction mixture obtained in the fluorination step is separated to obtain a main product component containing the major fluorinated substance as a majority component and a by-product component that is a component other than the main product component and contains the by-product hydrogen fluoride.

The purification step is a step where the by-product component obtained by the separation in the separation step is purified to obtain a recovered hydrogen fluoride component in which a concentration of an organic substance contained in the by-product component is reduced and a concentration of the by-product hydrogen fluoride is increased. The purification step makes it possible to obtain a recovered hydrogen fluoride component containing a high concentration of hydrogen fluoride.

The electrolysis step is a step where electrolysis is performed using the recovered hydrogen fluoride component obtained in the purification step as at least a part of an electrolyte and fluorine gas is produced.

The introduction step is a step where the fluorine gas obtained in the electrolysis step is introduced into a reaction field for fluorination in the fluorination step to use the fluorine gas obtained in the electrolysis step as at least a part of the fluorine gas that is used in the fluorination step.

The by-product component contains a component other than the main product component and contains a variety of organic substances together with the by-product hydrogen fluoride in some cases. For example, there is a case where the raw material compound that is not reacted and the minor fluorinated substance are contained in the by-product component. In addition, in the fluorination step, there is a case where a solvent or a diluent gas is made to coexist in the reaction field for fluorination and a reaction is performed. In a case where the solvent or diluent gas is organic, there is a case where the solvent, a fluorinated substance of the solvent, the diluent gas, and a fluorinated substance of the diluent gas are contained in the by-product component as organic substances. Furthermore, there is a case where a reaction is performed in state where an organic compound such as oil is used in a reaction device where fluorination is performed and the organic compound such as oil is present in the reaction field, and, in such a case, there is a case where the organic compound and a fluorinated substance of the organic compound are contained in the by-product component as organic substances. The by-product component preferably contains the by-product hydrogen fluoride as the majority component from the viewpoint of easiness in purification of the by-product component.

Since there is a concern that organic substances as described above may impair electrolysis, there is a case where hydrogen fluoride containing an organic substance cannot be used as a raw material for the production of fluorine gas by an electrolysis method. However, the method for producing fluorine gas according to the present embodiment includes the purification step of purifying the by-product component to obtain a recovered hydrogen fluoride component in which the concentration of the organic substance contained in the by-product component is reduced and the concentration of the by-product hydrogen fluoride is increased. Therefore, the concentration of the organic substance that is contained in the recovered hydrogen fluoride component is low, and thus it is possible to reuse the recovered hydrogen fluoride component as at least a part of the electrolyte for the production of fluorine gas by the electrolytic method.

In addition, according to the method for producing fluorine gas according to the present embodiment, since it is possible to effectively reuse the by-product hydrogen fluoride, fluorine gas can be economically produced, and contribution is also made for the economic production of the major fluorinated substance that is the target component. Furthermore, according to the method for producing fluorine gas according to the present embodiment, the performance of electrodes that are used for electrolysis is less likely to deteriorate, and electrolysis can be performed stably for a long period of time.

Hereinafter, the method for producing fluorine gas according to the present embodiment will be described in more detail.

The form of an electrolytic cell that is used in the electrolysis step is not particularly limited, and any electrolytic cell can be used in the method for producing fluorine gas according to the present embodiment as long as the electrolytic cell is capable of, for example, electrolyzing a molten salt electrolyte containing hydrogen fluoride to generate fluorine gas. As an anode of the electrolytic cell, a carbonaceous electrode such as a diamond electrode, a graphite electrode, or an amorphous carbon electrode can be used, and as a cathode, a metallic electrode made of iron, copper, nickel, MONEL, or the like can be used. As the electrolyte, for example, a molten salt KF·2HF containing hydrogen fluoride (the melting point is about 72° C.) can be used. The main body of the electrolytic cell can be made of a metal such as iron, nickel, or MONEL, but a corrosion-resistant alloy such as MONEL is preferable since the electrolyte is corrosive.

In the electrolysis step, a direct current is applied between the anode and the cathode, fluorine gas is generated from the anode, and hydrogen gas is generated from the cathode. Since hydrogen fluoride in the electrolyte has a vapor pressure, the hydrogen fluoride flows out from the electrolytic cell along with the fluorine gas and the hydrogen gas. In addition, the hydrogen fluoride in the electrolyte is consumed by the progress of electrolysis. Therefore, electrolysis is preferably performed while continuously or intermittently supplying and replenishing hydrogen fluoride to the electrolytic cell.

As illustrated in FIG. 1, hydrogen fluoride may be supplied to the electrolytic cell by transferring raw material hydrogen fluoride stored in a raw material hydrogen fluoride tank, may be supplied by transferring the recovered hydrogen fluoride component obtained by the purification step, or may be supplied by both. The raw material hydrogen fluoride and the recovered hydrogen fluoride component may be supplied to the electrolytic cell after being mixed in advance or may be supplied separately to the electrolytic cell.

The hydrogen fluoride-containing fluorine gas discharged from the electrolytic cell is sent to the fluorination step through the introduction step and is used for fluorination where the fluorine gas is reacted with the raw material compound. The temperature and pressure of a fluorination reaction and the concentrations of the fluorine gas and the raw material compound in the fluorination step depend on the type or reaction form of the raw material compound and are thus not generally determined. The reaction is performed while the temperature and pressure of the fluorination reaction and the concentrations of the fluorine gas and the raw material compound are controlled to be appropriate predetermined values.

The type of the fluorination reaction is not particularly limited, and any of a gas-phase direct fluorination reaction where the fluorine gas is reacted with a gas-phase raw material compound, a liquid-phase direct fluorination reaction where the fluorine gas is reacted with a liquid-phase raw material compound, and a solid direct fluorination reaction where the fluorine gas is reacted with a solid raw material compound may be adopted.

The type of the raw material compound is not particularly limited, examples thereof include a hydrocarbon, a halogenated hydrocarbon, an alcohol, an ether, an ester, a ketone, a carboxylic acid, and the like, and a compound having 2 or more and 18 or less carbon atoms and 1 or more hydrogen atoms is preferable. In the compound having 2 or more and 18 or less carbon atoms and 1 or more hydrogen atoms, a side reaction where a carbon-carbon bond is cleaved is less likely to occur due to the reaction heat of the fluorination reaction.

The compound having 2 or more and 18 or less carbon atoms and 1 or more hydrogen atoms is preferably an alkane or a halogenated alkane from such a viewpoint. In this halogenated alkane, a part or all of the hydrogen atoms in an alkane are each substituted with a halogen atom other than fluorine.

For example, in a case where 1,2,3,4-tetrachlorobutane is used as the raw material compound, 1,1,2,3,4,4-hexafluoro-1,2,3,4-tetrachlorobutane is generated as the major fluorinated substance, and dichlorotetrafluoroethane, 1,1-dichloro-2,2,2-trifluoroethane, or the like is generated as the minor fluorinated substance.

As another example, in a case where 1,1,2,2-tetrafluoroethane is used as the raw material compound, perfluoroethane is generated as the major fluorinated substance, and nonafluorobutane or the like is generated as the minor fluorinated substance. As still another example, in a case where 1-chloro-1,1,2,3,3-pentafluoropropane is used as the raw material compound, 1-chloroheptafluoropropane is generated as the major fluorinated substance, and perfluoroethane, perfluoromethane, or the like is generated as the minor fluorinated substance.

In the case of the gas-phase direct fluorination reaction, in order to reduce the amount of the reaction heat, there is a case where the raw material compound is fluorinated after the fluorine gas and the raw material compound are diluted with a diluent gas that is less likely to react with the fluorine gas, and there is a case where the diluent gas is organic. In addition, in the case of the liquid-phase direct fluorination reaction, in order to reduce the amount of the reaction heat, there is a case where the raw material compound is fluorinated after a liquid-phase raw material compound is diluted with a solvent (liquid solvent) that is less likely to react with the fluorine gas, and there is a case where the solvent is organic.

Furthermore, in the case of the gas-phase direct fluorination reaction, there is a case where a blower for circulating the gas in the reaction field (reactor) is installed as a part of the reaction device where fluorination is performed, and, in the case of the liquid-phase direct fluorination reaction, there is a case where a stirrer for stirring the liquid in the reaction field (reactor) or a pump for sending the liquid in the reaction field (reactor) to the next step is installed as a part of the reaction device where fluorination is performed. Since there is a case where an organic compound such as hydraulic oil is used in the device such as the blower, there is a concern that the organic compound such as hydraulic oil may leak into a region in the reaction device where the organic compound such as hydraulic oil comes into contact with hydrogen fluoride and be present in the reaction field.

Therefore, there is a case where the by-product component (the by-product hydrogen fluoride or the like) obtained by the separation step contains an organic substance in addition to the minor fluorinated substance. That is, there is a case where the by-product component (the by-product hydrogen fluoride or the like) obtained by the separation step contains the above-described diluent gas, solvent, and organic compound and fluorinated substances thereof.

Examples of the diluent gas include nitrogen gas, helium, and argon, which are inert gases, and tetrafluoromethane ($CF_4$), hexafluoroethane ($C_2F_6$), chloropentafluoroethane ($C_2ClF_5$), perfluoropropane ($C_3F_8$), and the like that are gases of an organic substance that is less likely to react with the fluorine gas.

Examples of the solvent include acetonitrile ($CH_3CN$), methanol, trichlorofluoromethane, carbon tetrachloride, trichlorotrifluoroethane, hexafluorotetrachlorobutane, trichloroheptafluorobutane, and the like.

Examples of the organic compound such as hydraulic oil include chlorotrifluoroethylene polymers (for example, trade name DIFLOIL (trademark)) and perfluoropolyethers (for example, trade name FOMBLIN (trademark)). There has been a case where the chlorotrifluoroethylene polymers and the perfluoropolyethers are used for sealing materials in operation units and a case where the chlorotrifluoroethylene polymers and the perfluoropolyethers leak into the region in the reaction device where the chlorotrifluoroethylene polymers and the perfluoropolyethers come into contact with hydrogen fluoride. Therefore, there has been a case where these organic compounds are contained in the recovered hydrogen fluoride component.

As described above, since there is a concern that these organic substances that are contained in the by-product component that is obtained by the separation step such as gas-liquid separation may impair the electrolysis of hydrogen fluoride, these organic substances are removed from the by-product component in the purification step.

A method for purifying the by-product component in the purification step is not particularly limited, and a method in which at least one of a distillation operation, an adsorption operation, and a liquid-liquid separation operation is used can be exemplified.

In the distillation operation, a shelf-type or packing-type distillation tower can be used. A gas-phase or liquid-phase by-product component extracted from the reactor is supplied to the distillation tower as it is, and a component having a lower boiling point than hydrogen fluoride and a component having a higher boiling point than hydrogen fluoride are distilled and removed, thereby purifying the by-product component and obtaining a recovered hydrogen fluoride component in which the concentration of the organic substances is reduced and the concentration of the by-product hydrogen fluoride is increased.

An organic substance that is not easily removed by the distillation operation is removed by the adsorption operation where the organic substance is adsorbed with a packed tower packed with at least one of activated carbon and alumina or is removed by the liquid-liquid separation operation in a case where the organic substance does not dissolve in hydrogen fluoride.

It is more preferable to circulate the by-product component in an adsorption tower of activated carbon after the distillation operation since it is possible to effectively reduce the organic substances.

Since it is common that organic substances that do not easily dissolve in hydrogen fluoride also do not easily dissolve in water, when the gas-phase or liquid-phase by-product component extracted from the reactor is mixed with water, the concentration in water of the organic substance that does not easily dissolve in water is low, and it is possible to obtain a hydrogen fluoride aqueous solution where a large amount of hydrogen fluoride that easily dissolves in water dissolves. When this hydrogen fluoride aqueous solution is distilled to remove water, it is possible to obtain hydrogen fluoride having a small content of the organic substances.

The total concentration of the organic substances in the recovered hydrogen fluoride component obtained by purifying the by-product component is preferably 200 mass ppm or less, more preferably 100 mass ppm or less, still more preferably 50 mass ppm or less, and most preferably 10 mass ppm or less.

Since there is a case where it is not possible to furnish the full amount of hydrogen fluoride that is used as the electrolyte in the electrolysis step from the recovered hydrogen fluoride component alone, in a case where the amount of the recovered hydrogen fluoride component is not sufficient, a deficit of hydrogen fluoride is supplied from the raw material hydrogen fluoride tank. Therefore, the concentration of the organic substances in the recovered hydrogen fluoride component is diluted with the hydrogen fluoride supplied from the raw material hydrogen fluoride tank, and the diluted concentration becomes the concentration of the organic substances in hydrogen fluoride that is used as the electrolyte in the electrolysis step. Therefore, there is a case where the diluted concentration (the concentration of the organic substances in hydrogen fluoride that is used as the electrolyte in the electrolysis step) becomes 100 mass ppm or less.

Next, an influence on electrolysis of the organic substances that are contained in hydrogen fluoride will be described below in detail.

PTL 2 describes the behaviors of an anode when water has been supplied to an electrolytic cell. It is described that, when water is electrolyzed, an oxide film is formed on the surface of a carbon electrode, which is the anode, this film is converted to a fluoride film, thus, the electrode is poorly wetted by an electrolyte, and the electrolysis voltage rises.

As the organic substances that may be contained in the recovered hydrogen fluoride component that is recovered from the fluorination reaction of the raw material compound, chlorofluorocarbons, fluorocarbons, hydrochlorofluorocarbons, hydrofluorocarbons, and the like are exemplified. These organic substances are organic substances that are generated by the fluorination reaction between the raw material compound and the fluorine gas and are thus organic substances that have been converted to a form where the organic substances do not easily react with the fluorine gas even when coming into contact with the fluorine gas again. Therefore, these organic substances are present as molecules in the electrolyte without being electrolyzed and float in a dissolved state or a liquid-phase state and thus can be considered as irrelevant substances that do not get involved with an electrode reaction as moisture does.

When these organic substances are present in the electrolyte and placed in an electric field, a phenomenon where the organic substances are adsorbed to a carbon electrode due to the polarity of the molecules occurs, and the surface of the carbon electrode to which these organic substances have been adsorbed becomes a surface that does not come into contact with the electrolyte. This makes it impossible for the electrode reaction to proceed. In the case of constant voltage electrolysis, the current significantly decreases, and when the amount of the organic substances present in the electrolyte increases, there may be a case where the current does not flow. In the case of constant current electrolysis, a phenomenon where the voltage of the anode extremely rises occurs.

In the electrolysis step, in addition to the carbonaceous anode, nickel can be used as the anode. However, in the case of a nickel anode, since a dissolution reaction of nickel occurs, there is a case where the nickel anode cannot be used for electrolysis for a long period of time due to the consumption of the electrode. Therefore, a carbonaceous anode is usually used in the electrolysis step.

As a result of performing constant voltage electrolysis using nickel as an anode to compare with the behaviors of the carbonaceous anode, the presence of the organic substances made it slightly difficult for the current to flow, but the amount of the current decreased was almost constant irrespective of the concentration of the organic substances, and a behavior by which the flow of the current was prevented as in the carbon electrode did not easily occur even when the amount of the organic substances present was increased. From this fact, it is also found that the organic substances that are contained in hydrogen fluoride that is recovered from the fluorination step are likely to impair the electrode reaction on the surface of, particularly, the carbon electrode compared with the nickel electrode.

Figure 2:
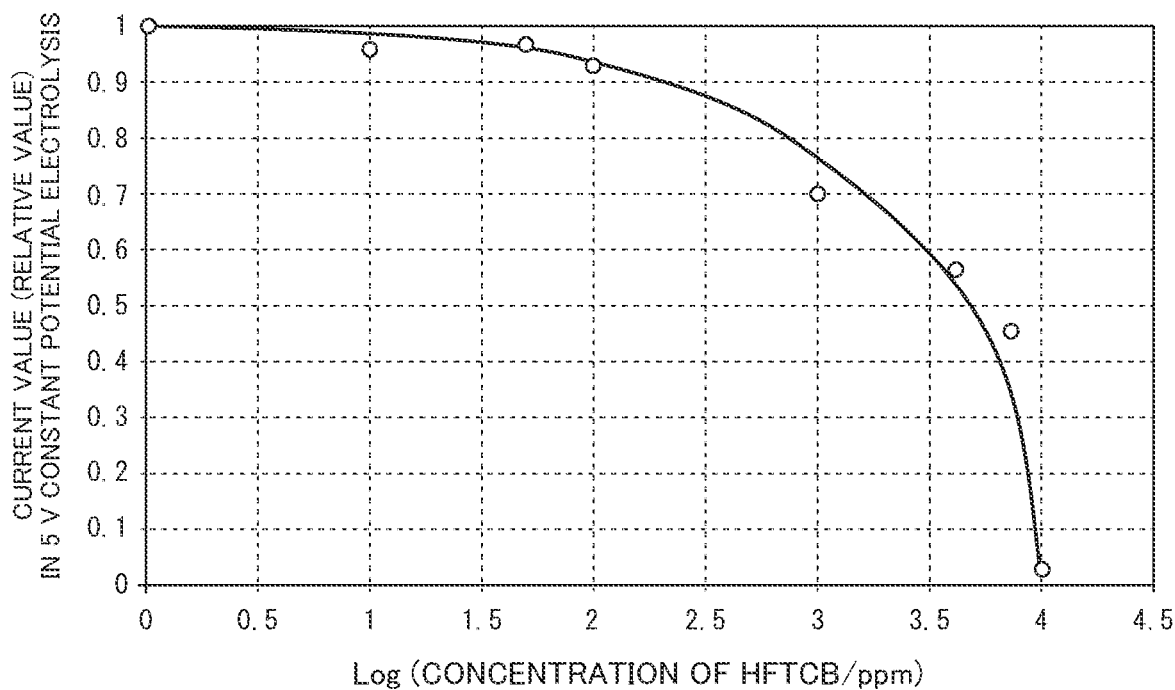
FIG. 2 is a graph illustrating a relationship between the concentration of HFTCB in an electrolyte and the current value (relative value) in electrolysis.

For example, in a case where 1,1,2,3,4,4-hexafluoro-1,2,3,4-tetrachlorobutane (hereinafter, referred to as "HFTCB" in some cases) is added to a KF·2HF electrolyte (the temperature of the electrolyte is 85° C.), when the concentration of HFTCB is 200 mass ppm (Log 200=2.3), the current value decreases by about 10% from the current value with no HFTCB added, and, when the concentration of HFTCB is 10,000 mass ppm, the current almost does not flow (refer to FIG. 2).

The solubility of HFTCB in the electrolyte is not so high, and, when more than 500 mass ppm of HFTCB was added, HFTCB was present on the surface of the electrolyte in a state of being separated into two layers. Since the influence on the electrode reaction becomes concentration-dependent depending on the amount of HFTCB added in spite of the state of HFTCB being separated into two layers, it is conceivable that the electrode deteriorates by a mechanism in which, when HFTCB dissolved in the electrolyte is adsorbed to the electrode and HFTCB in the electrolyte decreases, HFTCB separated into two layers dissolves in the electrolyte. In addition, since fluorine gas bubbles are generated by electrolysis, and the electrolyte is stirred, it is also conceivable that liquid particles float in the electrolyte and these liquid particles are adsorbed to the electrode, which causes the electrode to deteriorate.

Although the mechanism by which the electrode is caused to deteriorate is not clear, this phenomenon of a decrease in the current value occurs in the same manner even in a case where the organic substances that are contained in hydrogen fluoride that is recovered from the fluorination step are different organic substances.

In addition, the fluorine gas that was generated during electrolysis was analyzed, and no organic substances were present in the fluorine gas. For example, in a case where the fluorine gas generated by electrolysis reacts with HFTCB, HFTCB is not discharged from the electrolyte, and when HFTCB is present in hydrogen fluoride, HFTCB gradually accumulates in the electrolyte, and about 10% of the current decreases when the total amount of HFTCB accumulated becomes 200 mass ppm with respect to the electrolyte. Therefore, the concentration of the organic substances in hydrogen fluoride is also desirably set to 200 mass ppm or less. As the concentration of the organic substances in hydrogen fluoride decreases, the above-described influence becomes smaller. Therefore, the concentration of the organic substances in hydrogen fluoride is more preferably 100 mass ppm or less, still more preferably 50 mass ppm or less, and most preferably 10 mass ppm or less.

PTL 3 describes the following three methods regarding organic electrolytic fluorination reactions, but these methods are not related to the effect of the present invention.

(1) A Simmons method in which an organic substance is dissolved in anhydrous hydrogen fluoride and fluorinated with a nickel anode.

(2) A Philip method in which KF·2HF is used as an electrolyte, and a gas-phase organic substance is blown into an electrolytic cell and fluorinated with a carbon anode.

(3) A method in which a fluorine source and an organic substance are dissolved in an aprotic solvent and fluorinated with a diamond electrode.

Since the organic substances that are used in these methods are compounds that are likely to undergo a fluorination reaction, and a reaction by which fluorine atoms generated in an electrode by electrolysis fluorinate hydrogen atoms in the organic substance proceeds, the organic substance near the electrode undergoes a fluorination reaction due to the fluorine atoms on the surface of the electrode before being adsorbed to the electrode. Therefore, the organic substance diffuses into the electrolyte from the vicinity of the electrode without accumulating on the surface of the electrode.

In contrast, the organic substance in the present invention is an organic substance that is generated in the fluorination step and is thus a compound that is less likely to cause a fluorination reaction. Therefore, the organic substance in the vicinity of the electrode interacts with the fluorine atoms on the electrode to a small extent, and a phenomenon where the organic substance is adsorbed to the electrode occurs. For example, it is found that, since the waveforms of cyclic voltammograms that are obtained by scanning at a cell voltage within a range of 0 V to 10 V are the same between a case where HFTCB is added to the KF·2HF electrolyte and a case where HFTCB is not added thereto, a current corresponding to the fact that HFTCB is oxidized by the fluorination reaction cannot be observed, and HFTCB does not contribute to the fluorination reaction.

EXAMPLES

Hereinafter, the present invention will be described more specifically by describing examples and comparative examples.

Example 1

As a fluorination reaction, a reaction for synthesizing 1,1,2,3,4,4-hexafluoro-1,2,3,4-tetrachlorobutane (boiling point: 134° C.), which was a major fluorinated substance, by reacting fluorine gas with 1,2,3,4-tetrachlorobutane (hereinafter, referred to as "TCB"), which was a raw material compound, was performed.

A reaction solution (4700 kg, 2.8 m$^3$) obtained by adding TCB to an HFTCB solvent such that the concentration became 10% by mass was fed into a stainless steel reactor having a capacity of 4 m$^3$, and fluorine gas-containing gas for which fluorine gas was diluted with a nitrogen gas to a concentration of 30% by volume was supplied under stirring at a rotation speed of 70 rpm with a stirrer including stirring blades (six flat turbines), thereby fluorinating TCB at a reaction temperature of 70° C.

The fluorine gas-containing gas was supplied to the reaction solution from a fluorine gas supply port provided in a lower part of the stirrer in the reactor, and the amount of the fluorine gas-containing gas supplied was set to 277 L/min (0° C., in terms of 0 MPaG).

An exhaust gas pipe for discharging the gas in the reactor is connected to a portion of the reactor that faces a gas-phase portion, and a control valve configured to adjust the pressure in the reactor is mounted in the exhaust gas pipe. In addition, a reaction was performed while the pressure of the gas-phase portion in the reactor was adjusted to 0.05 MPaG with the control valve in terms of the gauge pressure. An extraction tube configured to extract the reaction solution in the reactor is connected to a portion of the reactor that faces a liquid-phase portion.

As a result of the fluorination reaction, hydrogen atoms of TCB were substituted with fluorine atoms, HFTCB was generated, and at the same time, hydrogen fluoride was produced as a by-product. The liquid-phase portion in the reactor was a main product component where HFTCB was the majority component and was separated and transferred as a liquid-phase substance in a separation step. Since hydrogen fluoride has a boiling point of 19.5° C., a by-product component containing by-product hydrogen fluoride as the majority component was extracted from the gas-phase portion in the reactor to the outside of the reactor via the exhaust gas pipe. Apart of an exhaust gas extracted from the reactor was cooled to −70° C., the nitrogen gas that had not been condensed was discarded, and 50 kg of a by-product component containing liquefied by-product hydrogen fluoride was collected. The collected by-product component (hereinafter, referred to as "liquid A") contained a variety of organic substances (for example, organic substances produced as by-products by the fluorination reaction).

The liquid A was analyzed, and a total of about 1% by mass of the organic substances (250 mass ppm of dichlorotetrafluoroethane, 530 mass ppm of 1,1-dichloro-2,2,2-trifluoroethane, 7400 mass ppm of HFTCB, and 1800 mass ppm of the other organic substances) with respect to the hydrogen fluoride were contained.

Next, the liquid A was charged into a packing-type distillation tower. This distillation tower was made of stainless steel, the tower diameter was 20 mm, the packed layer height was 1 m, and the distillation tower was packed with a stainless steel ring. A container at the bottom of the tower was heated to 20° C., the top of the tower was cooled to 0° C., and the liquid A was distilled at normal pressure while an uncondensed component was exhausted to the outside of the distillation tower. The exhaust of the uncondensed component from the top of the tower was stopped at a time when the pressure did not increase any longer, the gas-phase portion was extracted from the top of the tower while being refluxed, and a condensed liquid (hydrogen fluoride) was collected. This collected liquid will be hereinafter referred to as "liquid B".

As a result of analyzing the organic substances that were contained in the liquid B, the concentration of dichlorotetrafluoroethane was 27 mass ppm, the concentration of 1,1-dichloro-2,2,2-trifluoroethane was 12 mass ppm, the concentration of HFTCB was 3 mass ppm, and the concentration of the other organic substances was 1 mass ppm or less, which was the lower limit of detection. That is, the total amount of the organic substances that were contained in the liquid B was 43 mass ppm or less.

Next, an adsorption tower containing activated carbon packed in a container having a capacity of 300 mL was prepared, and the liquid B was circulated in the adsorption tower to be purified. A liquid purified by the adsorption tower (hydrogen fluoride) will be hereinafter referred to as "liquid C". As a result of analyzing the organic substances that were contained in the liquid C, there was no organic substance having a concentration of more than 1 mass ppm, which was the lower limit of detection. A method for determining the amounts of the organic substances in hydrogen fluoride was as follows. That is, a gas mixture containing a nitrogen gas mixed with a gasified sample was circulated to an alkaline aqueous solution or soda lime to neutralize hydrogen fluoride, and the neutralized gas mixture was analyzed by gas chromatography.

Next, an electrolytic cell (the material was MONEL) packed with KF·2HF (500 mL) was prepared, and an electrolyte was electrolyzed, thereby producing fluorine gas. An anode of the electrolytic cell was a diamond electrode, a cathode was a nickel electrode, and the areas of the facing surfaces of both electrodes facing each other were each 1 cm$^2$. In addition, this electrolytic cell had a pipe for discharging the fluorine gas and hydrogen gas to be generated from the electrolytic cell and a pipe configured to supply hydrogen fluoride to the electrolytic cell.

As a result of performing constant current electrolysis at a current of 1.0 A with the temperature of the electrolyte set to 85° C., the cell voltage was 6.8V. When the electrolysis was continued, the hydrogen fluoride in the electrolyte gradually disappeared, and thus the hydrogen fluoride that had disappeared was replenished every 100 hours. At this time, the hydrogen fluoride that was used for the replenishment was the liquid C, and 39 g of the liquid C was replenished every 100 hours. The constant current electrolysis was performed for 1000 hours, but the cell voltage remained unchanged at 6.8 V.

Example 2

Constant current electrolysis was performed in the same manner as in Example 1 except that the liquid B of Example 1 was used as the hydrogen fluoride that was replenished to the electrolytic cell. After the constant current electrolysis began, 39 g of the liquid B was replenished every 100 hours, and a total of 390 g of hydrogen fluoride was replenished during 1000 hours of the constant current electrolysis, but the cell voltage rose only to 7.2 V, and there was no change in the amount of fluorine gas generated.

Comparative Example 1

Constant current electrolysis was performed in the same manner as in Example 1 except that the liquid A of Example 1 was used as the hydrogen fluoride that was replenished to the electrolytic cell. Hydrogen fluoride was replenished for the first time after 100 hours from the beginning of the constant current electrolysis. The amount of the hydrogen fluoride replenished was 40 g. As a result of beginning constant current electrolysis again after the replenishment, the cell voltage rose to 8.0 V. After that, 40 g of the liquid A was replenished every 100 hours.

The cell voltage rose to 9.1 V with energization after a third replenishment performed after 300 hours, the cell voltage rose to 10.5 V with energization after a sixth replenishment performed after 600 hours, and the cell voltage rose to 11.5 V with energization after a ninth replenishment performed after 900 hours. As described above, the cell voltage gradually rose without being stabilized and could not be measured any longer due to the measurement limit, which made it impossible for the constant current electrolysis to continue.

Example 3

As a fluorination reaction, a reaction for reacting fluorine gas with 1,1,2,2-tetrafluoroethane (hereinafter, referred to as "TFE"), which was a raw material compound, to synthesize perfluoroethane (hereinafter, referred to as "PFE"), which was a major fluorinated substance, by a gas-phase reaction was performed.

Fluorine gas and TFE were supplied to a tubular reactor having an inner diameter of 50 cm, a length of 8 m, and a volume of 1570 L, the temperature of the reactor was controlled to be 350° C., and a reaction was performed at a reaction pressure of 0.2 MPaG (gauge pressure). The fluorine gas was diluted with PFE to a concentration of 4% by volume and supplied, and the amount of the fluorine gas supplied was set to 30 Nm$^3$. In addition, TFE was diluted with PFE to a concentration of 2% by volume and supplied, and the amount of TFE supplied was set to 15 Nm$^3$.

In a separation step, a gas discharged from the outlet of the reactor was cooled to −45° C., a gas that had not been condensed was used to purify PFE, and 50 kg of a liquid of a by-product component containing liquefied by-product hydrogen fluoride as the majority component was sorted. The sorted liquid (hereinafter, referred to as "liquid D") contained a variety of organic substances (for example, organic substances produced as by-products by the fluorination reaction).

As a result of analyzing the organic substances that were contained in the liquid D by gas chromatography, the concentration of nonafluorobutane (boiling point of 20° C. to 30° C.) generated by coupling of TFE was 150 mass ppm, and the concentration of unreacted TFE was 220 mass ppm.

The liquid D was distilled using the distillation tower used in Example 1, and a liquid containing hydrogen fluoride as a main component (hereinafter, referred to as "liquid E") was collected in a container at the top of the tower. As a result of analyzing the organic substances that were contained in the liquid E by gas chromatography, the concentration of nonafluorobutane was 21 mass ppm, and the concentration of TFE was 18 mass ppm.

Electrolysis was performed in the same manner as in Example 1, and 39 g of the liquid E was supplied every 100 hours to replenish hydrogen fluoride that had disappeared. A total of 390 g of hydrogen fluoride was replenished during 1000 hours of the constant current electrolysis, but the cell voltage rose only to 7.2 V, and there was no change in the amount of fluorine gas generated.

Comparative Example 2

Constant current electrolysis was performed in the same manner as in Example 3 except that the liquid D of Example 3 was used as the hydrogen fluoride that was replenished to the electrolytic cell. Hydrogen fluoride was replenished for the first time after 100 hours from the beginning of the constant current electrolysis. The amount of the hydrogen fluoride replenished was 40 g. As a result of beginning constant current electrolysis again after the replenishment, the cell voltage rose to 8.2 V, and an explosive sound was generated occasionally. 40 g of the liquid D was replenished every 100 hours, the cell voltage rose to 10.9 V with energization after a third replenishment performed after 300 hours, and the cell voltage with energization after a sixth replenishment performed after 600 hours could not be measured due to the measurement limit, which made it impossible for the constant current electrolysis to continue.

The invention claimed is:

1. A method for producing fluorine gas comprising:
reacting 1,2,3,4-tetrachlorobutane or 1,1,2,2-tetrafluoroethane as a raw material compound with fluorine gas to perform fluorination and obtaining a reaction mixture containing 1,1,2,3,4,4-hexafluoro-1,2,3,4-tetrachlorobutane or perfluoroethane which is a major fluorinated substance as a target component generated by the fluorination of the 1,2,3,4-tetrachlorobutane or 1,1,2,2-tetrafluoroethane, a minor fluorinated substance as a non-target component generated as a by-product by the fluorination of the 1,2,3,4-tetrachlorobutane or 1,1,2,2-tetrafluoroethane, and by-product hydrogen fluoride generated as a by-product in the fluorination;
separating the reaction mixture to obtain a main product component containing the 1, 1,2,3,4,4-hexafluoro-1,2,3,4-tetrachlorobutane or perfluoroethane as a majority component and a by-product component, the by-product component being a component other than the main product component and containing the by-product hydrogen fluoride;
purifying the by-product component to obtain a recovered hydrogen fluoride component in which a concentration of an organic substance contained in the by-product component is reduced and a concentration of the by-product hydrogen fluoride is increased;
performing electrolysis using the recovered hydrogen fluoride component as at least a part of an electrolyte to produce fluorine gas; and
introducing the fluorine gas obtained in the electrolysis into a reaction field for the fluorination in performing the fluorination to use the fluorine gas obtained in the electrolysis as at least a part of fluorine gas used in the fluorination;
wherein, the by-product component is purified such that a total concentration of the organic substance in the recovered hydrogen fluoride component becomes 200 mass ppm or less.

2. The method for producing fluorine gas according to claim 1, wherein the organic substance contained in the by-product component is at least one of the raw material compound that is not reacted, the minor fluorinated substance, a solvent caused to coexist with the raw material compound and the fluorine gas in the reaction field for the fluorination, a fluorinated substance of the solvent, a diluent gas caused to coexist with the raw material compound and the fluorine gas in the reaction field for the fluorination, a fluorinated substance of the diluent gas, an organic compound that is used in a reaction device in which the fluorination is performed and can be present in the reaction field, and a fluorinated substance of the organic compound.

3. The method for producing fluorine gas according to claim 1, wherein the raw material compound is a compound having 2 or more and 18 or less carbon atoms and having 1 or more hydrogen atoms.

4. The method for producing fluorine gas according to claim 3, wherein the compound having 2 or more and 18 or less carbon atoms and having 1 or more hydrogen atoms is an alkane or a halogenated alkane, and the halogenated alkane is an alkane in which a part or all of hydrogen atoms in the alkane are each substituted with a halogen atom other than fluorine.

5. The method for producing fluorine gas according to claim 1, wherein a method for purifying the by-product component in the purification includes at least one of a distillation operation, an adsorption operation, and a liquid-liquid separation operation.

6. The method for producing fluorine gas according to claim 5, wherein the distillation operation includes distilling a hydrogen fluoride aqueous solution obtained by causing the by-product hydrogen fluoride in the by-product component to be absorbed in water.

7. The method for producing fluorine gas according to claim 5, wherein the adsorption operation includes causing the organic substance in the by-product component to be adsorbed to an adsorbent having at least one of activated carbon and alumina.

8. The method for producing fluorine gas according to claim 2, wherein the raw material compound is a compound having 2 or more and 18 or less carbon atoms and having 1 or more hydrogen atoms.

9. The method for producing fluorine gas according to claim 2, wherein a method for purifying the by-product component in the purification includes at least one of a distillation operation, an adsorption operation, and a liquid-liquid separation operation.

10. The method for producing fluorine gas according to claim 3, wherein a method for purifying the by-product component in the purification includes at least one of a distillation operation, an adsorption operation, and a liquid-liquid separation operation.

11. The method for producing fluorine gas according to claim 4, wherein a method for purifying the by-product component in the purification includes at least one of a distillation operation, an adsorption operation, and a liquid-liquid separation operation.

* * * * *